United States Patent
Nakada et al.

[11] Patent Number: 4,743,100
[45] Date of Patent: May 10, 1988

[54] OPTICAL LOW PASS FILTER

[75] Inventors: Yasuo Nakada; Masuko Amemiya, both of Kanagawa, Japan

[73] Assignee: Sony Corporation, Tokyo, Japan

[21] Appl. No.: 776,478

[22] Filed: Sep. 16, 1985

[30] Foreign Application Priority Data

Sep. 26, 1984 [JP] Japan ................. 59-201355

[51] Int. Cl.$^4$ .................. G02B 5/30; H04N 9/097
[52] U.S. Cl. ............................. 350/403; 358/55
[58] Field of Search ............ 350/400, 403, 404; 358/55

[56] References Cited

U.S. PATENT DOCUMENTS

4,539,584  9/1985  Otake .................... 350/404
4,575,193  3/1986  Greivenkamp, Jr. ........... 350/403

*Primary Examiner*—Bruce Y. Arnold
*Attorney, Agent, or Firm*—Hill, Van Santen, Steadman & Simpson

[57] ABSTRACT

An optical low pass filter used in a video camera having a solid state image sensing device and a color separating filter is disclosed, which includes a first double refraction plate being arranged to separate an incident light ray to an ordinary light ray and an extraordinary light ray which is displaced from the ordinary light ray by a distance d in a direction with the angle substantially equal to $\theta$ relative to the horizontal scanning direction of the solid state image sensing device, wherein $\cos 2\theta = \sqrt{\frac{2}{3}}(0° < 2\theta < 90°)$, and a second double refraction plate being arranged to separate an incident light ray to an ordinary light ray and an extraordinary light ray which is displaced from the ordinary light ray by a distance d in a direction with the angle substantially equal to $-\theta$ relative to the horizontal scanning direction of the solid state image sensing device, whereby the optical low pass filter has the spatial frequency characteristic having a first trap frequency $u_1$ and a second trap frequency $2u_1$.

5 Claims, 5 Drawing Sheets

OPTICAL LOW PASS FILTER

BACKGROUND OF THE INVENTION

1. Field of the Invention

This invention generally relates to an optical low pass filter and, more particularly, to an optical low pass filter for use with an image sensing device, for example, a solid state image sensing device using a CCD (charge coupled device), an MOS (metal oxide semiconductor) device and the like which produces a predetermined image pickup output by carrying out the spatial sampling in two dimensions.

2. Description of the Prior Art

A color image pickup apparatus, or a color video camera using, for example, a CCD as the solid state image sensing device thereof is arranged to produce a predetermined color video output by sampling a color analyzed image of an object obtained through a color filter that is disposed at the front of the video camera.

In the image sensing system which produces a color signal by carrying out the color coding by the color filter and the spatial sampling at each color, it is well known that, based upon the side band component which is caused by the fact that sampling carrier is modulated by the sampling frequency component upon the sampling, an aliasing distortion will be produced. The generation of the carrier component which will cause such aliasing distortion is different dependent on the color coding.

Figure 1A:
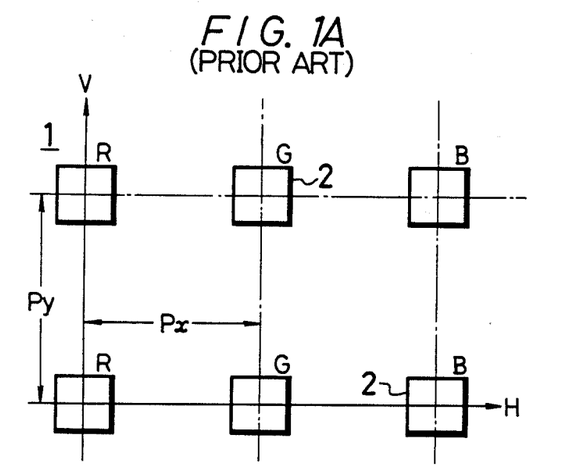
FIGS. 1A and 3A are diagrams showing patterns of opening portions of prior art CCD image sensors, respectively.
Figure 1B:
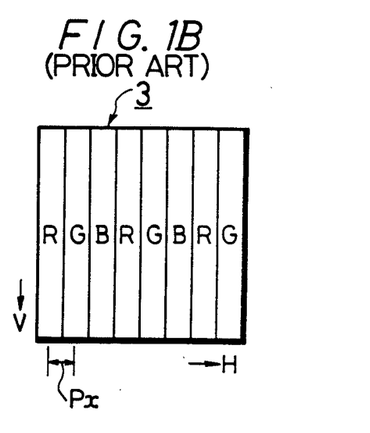
FIGS. 1B and 3B are diagrams each showing an example of a color filter which can be used for the CCD image sensor, respectively.

FIG. 1A is a diagram showing an example of the alignment of picture elements of one-chip CCD image sensor 1 and the opening portion thereof. In FIG. 1A, reference numeral 2 designates the picture element of the image sensor 1, reference letter H designates the horizontal scanning direction thereof, reference letter V designates the vertical scanning direction thereof, reference letter Px designates an opening width in the horizontal direction of the CCD image sensor 1 and reference letter Py designates an opening width in the vertical direction thereof. When a color filter 3 in which 3 of longitudinal stripe-shape color filter elements of three primary colors R (red), G (green) and B (blue) are repeated as shown in FIG. 1B is used for the image sensor 1, carrier components, which will be mentioned below, will be generated.

The spatial sampling in the horizontal direction of Px and in the vertical direction of Py is expressed by the following equation (1)

$$\Sigma\Sigma\delta(x - mPx, y - nPy) \quad (1)$$

where x and y designate horizontal and vertical coordinates respectively and m and n are both integers.

The carrier component produced by such spatial sampling is expressed by Fourier-transforming Eq. (1) and is presented as $$\mathcal{F}\,\Sigma\Sigma\delta(x - mPx, y - nPy) = \quad (2)$$

$$\frac{4\pi^2}{PxPy} \Sigma\Sigma\delta\left(u - \frac{2\pi m}{Px}, v - \frac{2\pi n}{Py}\right)$$

where $\mathcal{F}$ represents the Fourier transform and u and v represent the horizontal and vertical spatial frequencies, respectively.

Accordingly, carrier components $F_R$, $F_G$ and $F_B$ of the three primary color signals R, G and B produced when the color filter 3 shown in FIG. 1B is used are expressed by the following equations (3), (4) and (5), respectively.

$$F_R = \frac{4\pi^2}{6PxPy} \Sigma\Sigma\delta\left(u - \frac{2\pi m}{3Px}, v - \frac{2\pi n}{2Py}\right) \quad (3)$$

$$F_G = F_R \exp(-jPxu) \quad (4)$$

$$F_B = F_R \exp(-j2Pxu) \quad (5)$$

The exp $(-jPxu)$ and exp $(-j2Pxu)$ in the carrier components $F_G$ and $F_B$ represent phase differences relative to the carrier component $F_R$, respectively.

Figure 2:
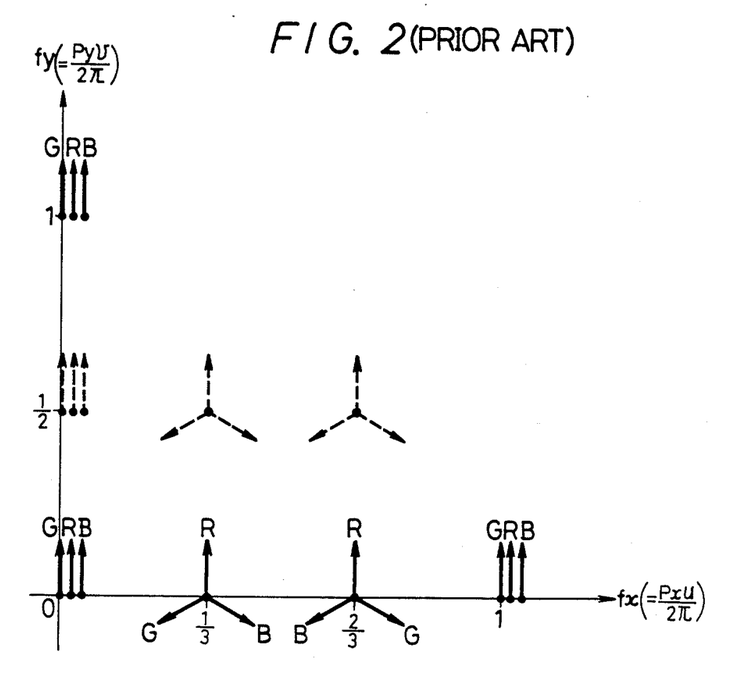
FIGS. 2 and 4 are spectrum diagrams of spatial frequency in the carrier components produced when the above color filters are used, respectively.

If such carrier components are shown on the spatial spectrum, they become as shown in FIG. 2. In FIG. 2, the abscissa $f_x$ and the ordinate $f_y$ represent the horizontal and vertical frequencies that are normalized by $Px/2\pi$ and $Py/2\pi$, respectively. In the spatial spectrums, the length of the arrow represents the magnitude of the carrier component, and the direction of the arrow represents the phase difference among the carrier components.

From this spatial spectrums, it will be seen that in addition to the base band component with the position of $(f_x, f_y) = (0, 0)$ as the center, the carrier components are produced respectively at the positions $(f_x, f_y) = (\frac{1}{3}, 0), (\frac{2}{3}, 0), (1, 0), (0, \frac{1}{2}), (0, 1)$ and so on as the center by the color separation sampling.

In the spatial spectrums of FIG. 2, there are only shown the carrier components which will cause the aliasing distortion and also the carrier components shown by broken lines if FIG. 2 are such ones which may be cancelled out by the electrical reading processing which will be described later.

The carrier components existing at the position of (1, 0) will cause a moiré when an object with a narrow stripe pattern formed of black and white stripes extending in the vertical direction is picked up; the carrier components existing at the position of $(\frac{2}{3}, 0)$ will cause a cross color which will present green and magenta colors when an object with a somewhat narrow longitudinal stripe pattern is picked up; and the carrier components existing at the position of $(\frac{1}{3}, 0)$ will cause a cross color which will present green and magenta colors when an object with a little rough longitudinal stripe pattern is picked up.

In like manner, the carrier components existing at the position of (0, 1) will produce a moiré when an object with a narrow horizontal stripe pattern is picked up, and the carrier components existing at the position of $(0, \frac{1}{2})$ will cause a flicker to occur by the interlaced scanning when an object with a little rough horizontal stripe pattern is picked up.

In this case, however, the flicker caused by the carrier components existing at the position of $(0, \frac{1}{2})$ can be electrically removed because the carrier components are cancelled out by reading out the CCD charge transfer device in the manner of a known field reading method (where two adjacent horizontal lines are read out simultaneously). For this reason, the quality of a picture is deteriorated mainly by the carrier components in the horizontal direction.

Figure 3A:
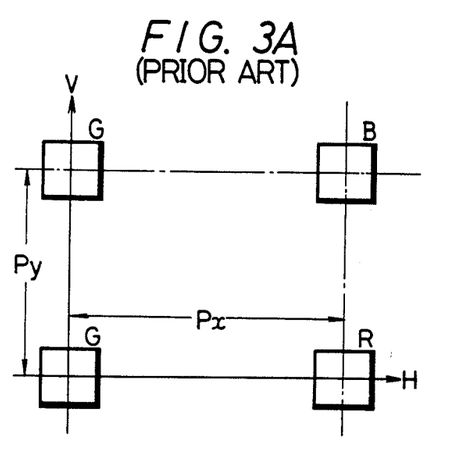

When a color filter of a pattern in which the color filter element of the primary color G is formed of longitudinal stripe and the color filter elements of the other primary colors R and B are formed of the color filter elements arranged in the line sequential manner is used as the color filter 3 shown in FIG. 1B, the fundamental lattice as shown in FIG. 3A is presented. As a result, the respective carrier components of the three primary colors R, G and B in the case of such color coding become as shown in FIG. 4 on the spatial spectrum.

Figure 3B:
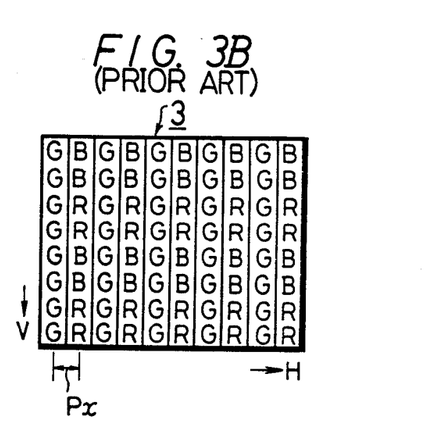
Figure 4:
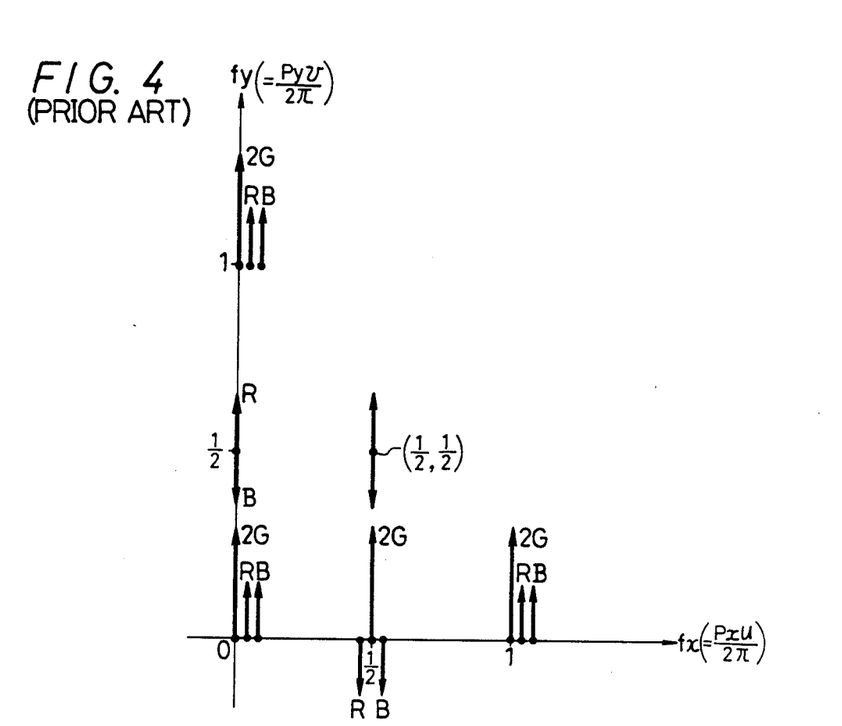

Also in FIG. 4, there are shown the carrier components that are harmful for the signal processing, similarly to FIG. 2. The moire will be caused by particularly the carrier components existing at the positions of $(f_x, f_y) = (1, 0)$ and $(0, 1)$, while the cross color will be caused by the carrier components existing at the positions of $(f_x, f_y) = (\frac{1}{2}, 0)$ and $(0, \frac{1}{2})$. In the case of the color coding as shown in FIG. 3B, since the primary colors R and B are arranged in the line sequential manner, the signal charge can not be read out by the field reading manner unlike the above-described example. However, if the vertical interpolation is carried out by the signal processing system provided affer the sample-and-hold operation for color separation was carried out, the moiré in the vertical direction can be reduced.

By the way, if the color filter 3 such as shown in FIG. 1B or 3B is used, the moiré and the cross color are produced due to the carrier components of the three primary colors R, G and B particularly existing in the horizontal frequency $f_x$ direction. Therefore, in the prior art, an optical low pass filter is disposed in the optical system of the image pickup apparatus, whereby the spatial frequency response in the horizontal frequency is made as a low pass characteristic, thus the carrier components being suppressed.

As such prior art optical low pass filters, there are used such ones in which three crystal plates are laminated as disclosed in a published document of Japanese examined patent application No. 50336/1983 and a published document of Japanese unexamined patent application No. 39683/1982. In the prior art optical low pass filter disclosed in the published document of Japanese patent application examined No. 50336/1983 and in the prior art optical low pass filter disclosed in the published document of Japanese unexamined patent application No. 39683/1982, there are respectively provided the low pass characteristics shown in FIG. 12 and FIG. 17 thereof by properly selecting a projection angle relative to the horizontal scanning direction H and a separated distance d on the pickup surface at each optical axis thereof.

If the characteristic of the optical low pass filter is set as such optical low pass characteristic as described hereinabove, the carrier components existing at the positions after the position of $(f_x, f_y) = (\frac{1}{2}, 0)$ are suppressed so that the occurrence of the moiré and cross color can be reduced and the deterioration of the quality of picture can be improved.

By the way, such prior art optical low pass filters are formed by laminating three crystal plates. As is known, a crystal plate is very expensive, and when three crystal plates are laminated, they must be laminated under the condition that they are accurately positioned so as to make the projection angles of the optical axes equal to the designed values. This requires high accuracy in laminating the three crystal plates so that it is difficult to manufacture the optical low pass filter. Hence the yield thereof is considerably low and the workability thereof is poor.

OBJECTS AND SUMMARY OF THE INVENTION

Accordingly, it is an object of this invention to provide an optical low pass filter which can be manufactured easily and at low cost.

It is another object of this invention to provide an optical low pass filter which is excellent in yield and cost performance.

It is further object of this invention to provide an optical low pass filter which is suitable for being applied to the optical system of an image sensing apparatus using a solid state image sensing device formed of a CCD (charge coupled device), MOS (metal oxide semiconductor) or the like.

According to one aspect of the present invention, there is provided an optical low pass filter used in a video camera having a solid stage image sensing device and a color separating filter, said optical low pass filter comprising: a first double refraction plate being arranged to separate an incident light ray to an ordinary light ray and an extraordinary light ray which is displaced from said ordinary light ray by a distance d in a direction with an angle substantially equal to $\theta$ relative to the horizontal scanning direction of said solid state image sensing device, wherein $\cos 2\theta = \sqrt{\frac{2}{3}} (0° < 2\theta < 90°)$, and a second double refraction plate being arranged to separate an incident light ray to an ordinary light ray and an extraordinary light ray which is displaced from said ordinary light ray by a distance d in a direction with an angle substantially equal to $-\theta$ relative to the horizontal scanning direction of said solid state image sensing device, whereby said optical low pass filter has the spatial frequency characteristic having a first trap frequency $u_1$ and a second trap frequency $2u_1$.

The above and other objects, features and advantages of the present invention will become apparent from the following detailed description of the illustrative embodiment thereof to be read in conjunction with the accompanying drawings, throughout which like references designate the same elements and parts.

DESCRIPTION OF THE PREFERRED EMBODIMENT

Now, an embodiment of an optical low pass filter according to this invention will hereinafter be described with reference to the drawings.

Figure 5:
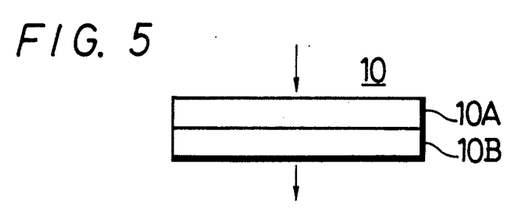
FIG. 5 is a diagram showing an embodiment of an optical low pass filter according to this invention.

FIG. 5 is a diagram showing an example of the optical low pass filter according to this invention. In FIG. 5, reference numeral 10 generally designates the optical low pass filter and this optical low pass filter 10 is formed of two double refraction plates, i.e., crystal plates 10A and 10B in this embodiment.

Figure 6A:
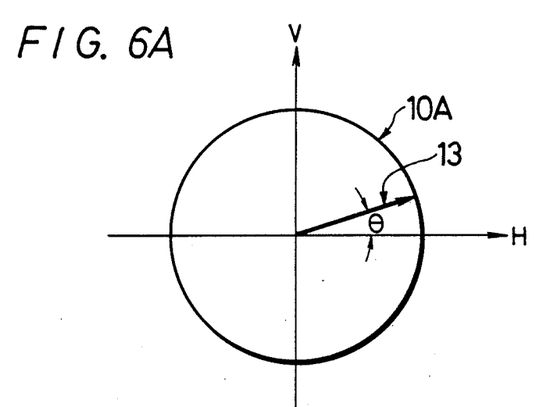
FIGS. 6A and 6B are diagrams useful for explaining the optical axis projection directions, respectively.
Figure 6B:
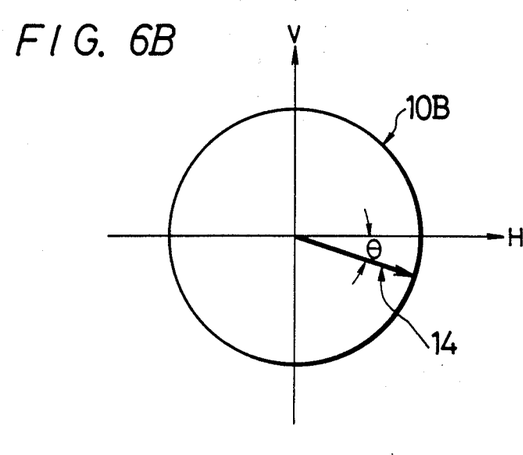

As the first and second crystal plates 10A and 10B, there are used such ones whose separating distances d are equal to each other. The first crystal plate 10A is arranged such that as shown in FIG. 6A, its optical axis projection direction 13 relative to the pickup surface of the CCD image sensor 1 is selected to have an angle $\theta$ (first quadrant in this embodiment) relative to the horizontal scanning direction H. Whereas, the second crystal plate 10B is arranged such that as shown in FIG. 6B, its optical axis projection direction 14 relative to the pickup surface of the CCD image sensor 1 is selected to have an angle $-\theta$ (the fourth quadrant in this embodiment) relative to the horizontal scanning direction H.

Accordingly, the incident light ray on the first crystal plate 10A is separated to an ordinary light ray and to an extraordinary light ray with a distance d therebetween in the optical axis projection direction 13. In like manner, the light ray incident on the second crystal plate 10B emitted from the first crystal plate 10A is separated to an ordinary light ray and to an extraordinary light ray with the distance d therebetween in the optical axis projection direction 14.

An acute angle $2\theta$ between the optical axis projection directions 13 and 14 is selected as $$\cos 2\theta = \sqrt{\tfrac{1}{3}} \tag{6}$$

where $0° < 2\theta < 90°$ is established.

Figure 7:
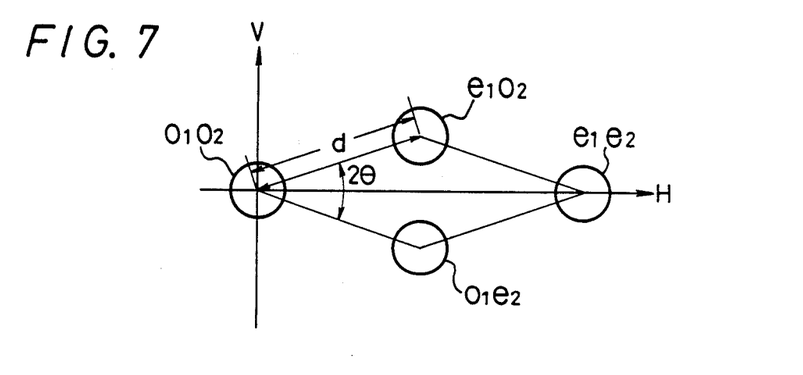
FIG. 7 is a diagram showing an example in which an incident light ray is separated into an ordinary light ray and an extraordinary light ray in accordance with this invention.

Accordingly, the incident light ray on the first crystal plate 10A is primarily separated to the ordinary light ray $o_1$ and the extraordinary light ray $e_1$ which are equal in light intensity and are parallel to each other and these two light rays $o_1$ and $e_1$ therefrom become incident on the second crystal plate 10B in which each of them is separated to the ordinary light ray and the extraordinary light ray. Therefore, as shown in FIG. 7, from the second crystal plate 10B, there are emitted an ordinary light ray $o_1o_2$ and an extraordinary light ray $o_1e_2$ based on the ordinary light ray $o_1$, and an ordinary light ray $e_1o_2$ and an extraordinary light ray $e_1e_2$ based on the extraordinary light ray $e_1$, that is, totally four light rays are emitted from the second crystal plate 10B. FIG. 7 shows the relation among these light rays $o_1o_2$, $o_1e_2$, $e_1o_2$ and $e_1e_2$ and the shape formed by connecting these light rays become a lozenge as shown in FIG. 7 and the line formed by connecting the ordinary light ray $o_1o_2$ and the extraordinary light ray $e_1e_2$ becomes parallel to the horizontal scanning direction H.

The light intensities (powers) of these light rays become as expressed by the following EQ. (7)

$$\begin{aligned} o_1o_2 &= o_1 \; \cos 2\theta \\ e_1o_2 &= e_1 \; \sin 2\theta \\ o_1e_2 &= o_1 \; \sin 2\theta \\ e_1e_2 &= e_1 \; \cos 2\theta \end{aligned} \tag{7}$$

where the light intensities of the ordinary light ray $o_1$ and the extraordinary light ray $e_1$ that are separated by the first crystal plate 10A become equal to each other so that $e_1 = o_1$ is established.

Figure 8A:
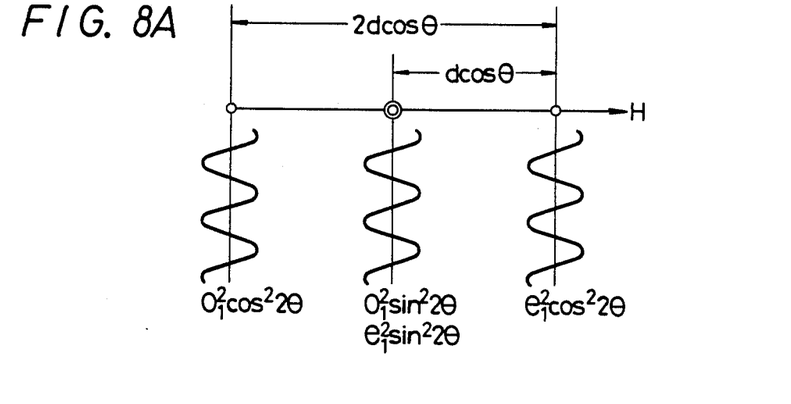
FIGS. 8A and 8B are diagrams showing projection components projected to the horizontal axis and vertical axis directions, respectively.
Figure 8B:
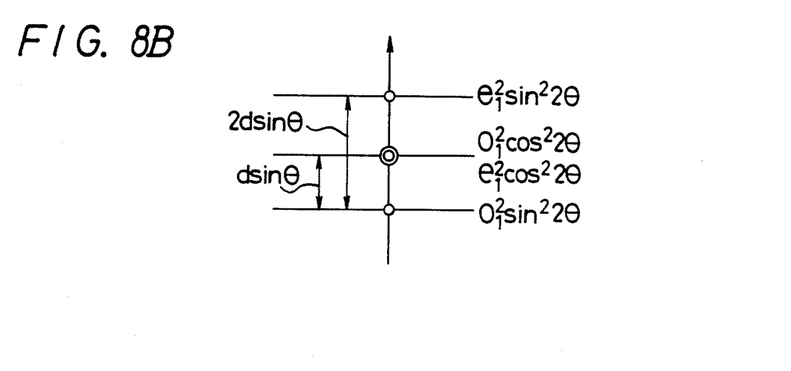

Next, if the components of the light rays separated as shown in FIG. 7 are respectively projected on the axes which are respectively in parallel to the horizontal and vertical axes, they become as shown in FIGS. 8A and 8B. In FIGS. 8A and 8B, the components indicated by the square equations express the powers of the ordinary light ray and the extraordinary light ray, respectively. In this case, the frequency response in the horizontal direction can be obtained in the similar manner to that shown in the published document of examined Japanese patent application No. 50336/1983.

If now the incident signal $Si(t)$ is taken as $2o_1^2 \cos 2\pi ft$, since $e_1 = o_1$ is established, the emitted signal $So(t)$ is expressed by the following equation:

$$\begin{aligned} So(t) &= o_1^2 \cos^2 2\theta \cos 2\pi f(t - d \cos\theta) + \\ &\quad e_1^2 \cos^2 2\theta \cos 2\pi f(t + d \cos\theta) + \\ &\quad e_1^2 \cos^2 2\theta \cos 2\pi ft + \\ &\quad o_1^2 \sin^2 2\theta \cos 2\pi ft \\ &= 2o_1^2 \cos^2 2\theta \cos 2\pi ft \cos 2\pi fd \cos\theta + \\ &\quad 2o_1^2 \sin^2 2\theta \cos 2\pi ft \end{aligned} \tag{8}$$

Therefore, the following Eq. (9) is obtained:

$$\therefore \frac{So(t)}{Si(t)} = \sin^2 2\theta + \cos^2 2\theta \cos(2\pi fd \cos\theta) \tag{9}$$

Since the spatial response is changed as $f \to u$, the frequency response $R_H(u)$ in the horizontal direction becomes as $$R_H(u) = \sin^2 2\theta + \cos^2 2\theta \cos(2\pi ud \cos\theta) \tag{10}$$

Similarly, the frequency response $R_V(v)$ in the vertical direction becomes as $$R_V(v) = \cos^2 2\theta + \sin^2 2\theta \cos(2\pi vd \sin\theta) \tag{11}$$

By the way, when an object image is subjected to the spatial sampling, in the case of FIG. 1B, the carrier components exist at the positions of $(f_x, f_y) = (\tfrac{1}{3}, 0), (\tfrac{2}{3}, 0)$ and $(1, 0)$. While the moiré and the cross color occur due to the existence of the above carrier components as described hereinabove, it will be clear that upon reproducing a color picture, the quality of picture can be improved more by removing the occurrence of the cross color rather than the moiré.

In view of these points, in accordance with this invention, in order that the occurrence of the cross color which will exert a strong influence on the quality of picture may be suppressed sufficiently, the frequency response in the horizontal direction shown by Eq. (10)

is determined. Since the cross color occurs when the carrier components exist at the positions of $(f_x, f_y) = (\frac{1}{3}, 0)$ and $(\frac{2}{3}, 0)$, if in the frequency response $R_H(u)$ obtained from Eq. (10), for the first trap point (frequency) $u_1$, the second trap point $u_2$ is selected to satisfy $u_2 \approx 2u_1$ and $u_1$ is selected to be $(f_x, f_y) = (f_{x1}, 0) = (\frac{1}{3}, 0)$ and $u_2$ is selected to be $(f_x, f_y) = (\frac{2}{3}, 0)$, the above-described object can be achieved.

The angle $\theta$ which can provide $u_1$ and $2u_1$ can be obtained as follows: From the condition of $R_H(u_1) = R_H(2u_1) = 0$, if the following simultaneous Eq. (12)

$$R_H(u_1) = \sin^2 2\theta + \cos^2 2\theta \cos(2\pi u_1 d \cos \theta) = 0 \\ R_H(2u_1) = \sin^2 2\theta + \cos^2 2\theta \cos(2\pi \times 2u_1 d \cos \theta) = 0 \quad (12)$$

is solved, the following Eq. (13) is obtained $$\cos 2\theta = \pm \sqrt{\tfrac{1}{3}} \quad (13)$$

Since $2\theta_1 < 90°$ is established, $$\cos 2\theta = \sqrt{\tfrac{1}{3}} \quad (14)$$

is established. The angle $\theta$ which can satisfy Eq. (14) becomes substantially 17.6°. At that time, if Eq. (14) is substituted into the first Eq. of the simultaneous equation (12), the relation which is expressed by the following equation (15)

$$u_1 = \frac{1}{6d} \times \frac{1}{\cos \theta} \quad (15)$$

can be obtained.

If the angle $\theta$ is selected so as to satisfy Eq. (14) and the separated distance d is selected in accordance with Eq. (15) such that the horizontal trap frequency $u_1$ coincides with $(f_x, f_y) = (\frac{1}{3}, 0)$, the characteristic of the horizontal frequency response $R_H(u)$ becomes as shown in FIG. 9A and the characteristic of the vertical frequency response $R_V(v)$ at that time becomes as shown in FIG. 9B.

Figure 9A:
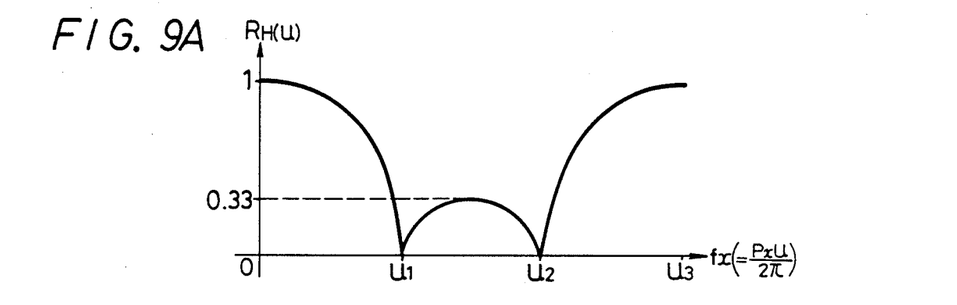
FIGS. 9A and 9B and FIGS. 10A and 10B are respectively characteristic graphs of the horizontal and vertical frequency responses useful for explaining the present invention.
Figure 9B:
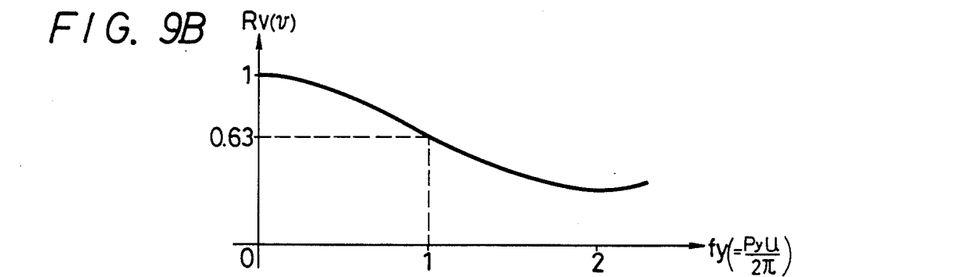

If the horizontal frequency characteristic of the optical low pass filter 10 is selected as shown in FIG. 9A, the carrier component is suppressed at the frequency of $(f_x, f_y) = (\frac{1}{3}, 0)$ and $(\frac{2}{3}, 0)$ so as to become zero. Therefore, even if there exist the carrier components at these frequencies, the cross color can be prevented from being produced. Accordingly, it is possible to prevent the reproduced picture image of the achromatic object image from being colored.

In addition, since even though the frequency response between the horizontal trap frequencies $u_1$ and $u_2$ is maximum but becomes less than $\frac{1}{3}$ the maximum response lower than the $u_1$, it is possible to lower the frequency response between $u_1$ and $u_2$ sufficiently.

When the horizontal frequency response $R_H(u)$ is selected to be the characteristic as shown in FIG. 9A, the frequency response becomes 1 at $u_3 = 3u_1$. In this case, however, taking the spatial frequency characteristic of the whole image sensing system including the optical lens system and the CCD image sensor in the image sensing device into consideration, the frequency response at $u_3 = 3u_1$ is decreased by about 20% from that of the case of FIG. 9A. Therefore, if the carrier components exist at the frequency, $u_3$, the quality of picture is deteriorated a little by the moiré caused thereby. Of course, if the frequency of the trap point $u_1$ is selected to be higher than 4.5 MHz, it is possible to reduce the occurrence of the moiré itself.

While in the above embodiment the angle $2\theta$ is selected so as to satisfy the condition of $2\theta \approx 35.2°$, the above-described effects can not be achieved by other angles than one described hereinabove. For reference, the horizontal spatial response provided when the angle $2\theta$ is selected so as to satisfy the condition of, for example, $2\theta = 45°$ is shown in FIG. 10.

Figure 10A:
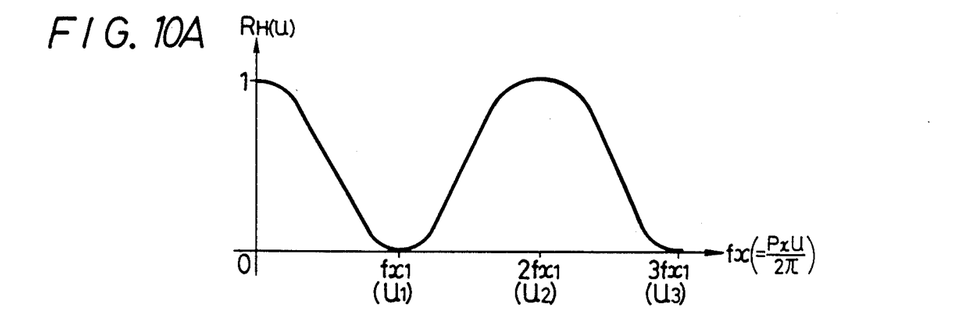

If the condition of $2\theta = 45°$ is established, the horizontal direction response $R_H(u)$ is expressed as $$R_H(u) = \sin^2 45° + \cos^2 45° \cos(2\pi ud \cos 22.5°) \\ = \tfrac{1}{2}(1 + \cos(2\pi ud \cos 22.5°)) \quad (16)$$

If Eq. (16) is given as the schematic representation, this becomes as shown in FIG. 10A.

As shown in FIG. 10A, the points to be trapped exist at the positions of $(f_x, f_y) = (f_{x1}, 0), (2f_{x1}, 0)$. If the separation distance d is selected such that the first trap point (frequency) $u_1$ provided when the $2\theta = 45°$ is established coincides with the position $(f_{x1}, 0)$, it becomes a characteristic shown by a curve 21 in FIG. 10B. In this case, the position, $f_{x1} = 2f_{x1}$ is not only the trap point but also the horizontal residual response becomes 1 so that the carrier components can not be suppressed at all. As a result, it is not possible to suppress the cross color based on the carrier components existing at the position of $(f_x, f_y) = (\frac{2}{3}, 0)$.

Figure 10B:
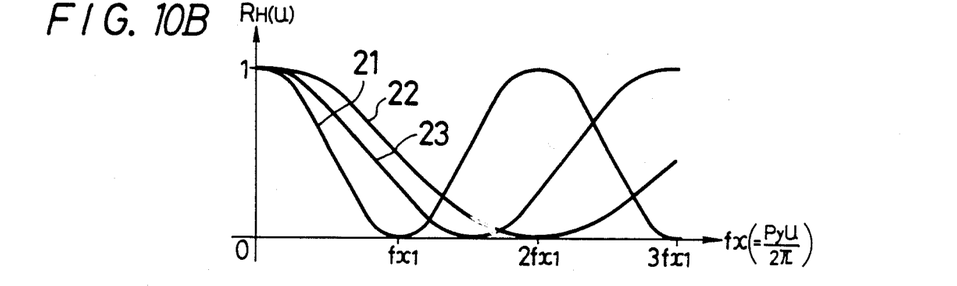

If the first trap point (frequency) $u_1$ provided when the condition of $2\theta = 45°$ coincides with the position $(2f_{x1}, 0)$, it becomes a characteristic shown by a curve 22 in FIG. 10B. In this case, at the position of $f_x = f_{x1}$, the horizontal residual response becomes 0.5. Thus at this trap point $u_1$, the cross color can not be suppressed so effectively.

If the first trap point $u_1$ provided when the condition of $2\theta = 45°$ is established is selected to be intermediate between the $f_{x1}$ and $2f_{x1}$ (the trap point is presented by the position $(3/2 \, f_{x1}, 0)$), it becomes a characteristic as shown by a curve 23 in FIG. 10B. In this case, the horizontal residual response at the position of $f_{x1}$ and $2f_{x1}$ becomes 0.25 so that both carrier components can not be suppressed so effectively.

Because, in order to obtain the effective carrier suppressing effect, the horizontal residual response must be selected to be about lower than 0.1.

The above-described optical axis projection direction does not have to be selected as $\theta$ and $-\theta$ strictly relative to the horizontal scanning direction H but may be selected near $\theta$ and $-\theta$. Further, the material for forming the double refraction plate is not limited to 2 crystal.

When the present invention is applied to the color filter 3 of the color coding shown in FIG. 3B, it will be seen from FIG. 4 that in the horizontal direction, the harmful carrier components exist at the positions of $(f_x, f_y) = (\frac{1}{2}, 0)$ and $(1, 0)$. Therefore, similarly to the embodiment as mentioned hereinabove, in order that the horizontal trap frequency $u_1$ may coincide with the position of $(f_x, f_y) = (\frac{1}{2}, 0)$, the separation distance d is selected in accordance with Eq. (15). Furthermore, since as to the vertical direction, the field reading method can not be employed as the reading method for the charge transfer in the case of the R and B line sequential signals, the carrier components in the vertical direction can be reduced by carrying out the vertical interpolation processing in the signal processing system provided after the color separation and sample-and-hold operation, thus causing no trouble in practical use.

As set forth above, according to this invention, it is possible to provide the optical low pass filter 10 which can suppress the carrier component that is harmful for reproducing the picture image. In addition, according to this invention, since such optical low pass filter 10 can be formed by simply laminating the two crystal plates 10A and 10B, it is possible to reduce the number of the crystal plates to be used as compared with the prior art and it is also possible to laminate the crystal plates accurately and rapidly. Accordingly, it is possible to provide the optical low pass filter which is inexpensive, high in yield and excellent in cost performance.

Consequently, this optical low pass filter of this invention is very suitable for being applied to the optical system of the image sensing apparatus using the solid state image sensing device formed of the CCD, MOS and the like.

The above description is given on a single preferred embodiment of the invention but it will be apparent that many modifications and variations could be effected by one skilled in the art without departing from the spirits or scope of the novel concepts of the invention, so that the scope of the invention should be determined by the appended claims only.

We claim as our invention:

1. An optical low pass filter used in a video camera having a solid state image sensing device and a color separating filter, said optical low pass filter comprising: a first double refraction plate being arranged to separate an incident light ray to an ordinary light ray and an extraordinary light ray which is displaced from said ordinary light ray by a distance d in a direction with an angle substantially equal to $\theta$ relative to the horizontal scanning direction of said solid state image sensing device, wherein $\cos 2\theta = \sqrt{\frac{2}{3}}$ ($0° < 2\theta < 90°$), and a second double refraction plate being arranged to separate an incident light ray to an ordinary light ray and an extraordinary light ray which is displaced from said ordinary light ray by a distance d in a direction with an angle substantially equal to $-\theta$ relative to the horizontal scanning direction of said solid state image sensing device, whereby said optical low pass filter has the spatial frequency characteristic having a first trap frequency $u_1$ and a second trap frequency $2u_1$.

2. An optical low pass filter according to claim 1, wherein said first and second double refraction plates are made of crystal.

3. An optical low pass filter according to claim 1, wherein said first and second double refraction plates are laminated.

4. An optical low pass filter according to claim 1, wherein said distance d is selected such that said first trap frequency $u_1$ is $\frac{1}{2}(Px/2\pi)$ where Px is a horizontal pitch of the image sensing unit of said solid state image sensing device.

5. An optical low pass filter according to claim 1, wherein said distance d is selected such that said first trap frequency $u_1$ is $\frac{1}{2}(Px/2\pi)$ where Px is a horizontal pitch of the sensing unit of said solid state image sensing device.

* * * * *